United States Patent [19]
Hirayama et al.

[11] Patent Number: 5,907,673
[45] Date of Patent: May 25, 1999

[54] CHECKPOINTING COMPUTER SYSTEM HAVING DUPLICATED FILES FOR EXECUTING PROCESS AND METHOD FOR MANAGING THE DUPLICATED FILES FOR RESTORING THE PROCESS

[75] Inventors: Hideaki Hirayama; Toshio Shirakihara, both of Tokyo, Japan

[73] Assignee: Kabushiki Kaisha Toshiba, Kawasaki, Japan

[21] Appl. No.: 08/896,335

[22] Filed: Jul. 17, 1997

[30] Foreign Application Priority Data

Sep. 3, 1996 [JP] Japan .................................. 8-233021

[51] Int. Cl.[6] ................................................... G06F 12/00
[52] U.S. Cl. ............................... 395/182.14; 395/182.04; 395/182.11; 395/182.13; 707/202; 707/200
[58] Field of Search ........................ 395/182.14, 182.04, 395/182.13, 182.11; 707/202, 200

[56] References Cited

U.S. PATENT DOCUMENTS

| | | | |
|---|---|---|---|
| 5,235,700 | 8/1993 | Alaiwan et al. | 395/182.11 |
| 5,530,801 | 6/1996 | Kobayashi | 395/182.11 |
| 5,621,885 | 4/1997 | Del Vigna, Jr. | 395/182.11 |
| 5,737,514 | 4/1998 | Stiffler | 395/182.11 |
| 5,794,252 | 8/1998 | Bailey et al. | 707/202 |

*Primary Examiner*—Ly V. Hua
*Attorney, Agent, or Firm*—Oblon, Spivak, McClelland, Maier & Neustadt, P.C.

[57] ABSTRACT

A computer system which can achieve rollback operation when a fault occurs in the system without waiting for side-tracking of pre-update data during updating of a file. When a file write request has been made, "file writing information" pertaining to the file write is saved in a pending queue and only a primary file is immediately updated. After a checkpoint has been acquired, the "file writing information" saved in the pending queue is shifted to a confirmed queue, and is then written to a back-up file. When performing recovery, all pre-update data which corresponds to the data which has been updated since the last checkpoint acquired is read from the back-up file, based on the "file writing information" saved in the pending queue. The primary file is then restored to its state at the checkpoint time by using the pre-update data which has been read from the backup file.

25 Claims, 13 Drawing Sheets

CHECKPOINTING COMPUTER SYSTEM HAVING DUPLICATED FILES FOR EXECUTING PROCESS AND METHOD FOR MANAGING THE DUPLICATED FILES FOR RESTORING THE PROCESS

BACKGROUND OF THE INVENTION

Field of the Invention

The present invention relates to checkpointing computer systems suitable for application to group computing processes in network-connected computing environments and a method for managing files in the computer system. In particular, the present invention relates to a duplicated checkpointing computer system suitable for application in a fault tolerant computer system and method for improving efficiency of file updates in the fault tolerant computer system.

More particularly, the present invention relates to a network-connected computer system and file management method suitable for applications such as database processes and transaction processes which require high reliability of the network-connected computer system.

Further more particularly, the present invention relates to a duplicated checkpointing computer system suitable for application to construction of a fault tolerant computer system which is comprised of a working system and a standby system in which checkpoints are acquired and saved in both the working system and the standby system, and a file management method that achieves high efficiency in updating files of the duplicated checkpointing computer system.

Still further, the present invention relates to multiple checkpointing computer systems in a network-connected computing environment and a file management method that achieves high efficiency in updating files of multiple systems by eliminating unnecessary reading of pre-update data from files if a failure is detected during execution of a process.

DISCUSSION OF BACKGROUND

Fault tolerant computer systems, often referred to as checkpointing computer systems, utilize checkpoints which are periodically acquired in order to recover from a fault or failure which may be detected in operation between any two checkpoints. In a checkpointing computer system, states such as an address space and context information for each operation, and files of each process, are periodically stored (this operation is referred to as a "checkpointing of uniting process" or simply as checkpointing) for recovering from the failure.

When a failure occurs, a state of the last checkpoint acquired is restored and execution of the process is re-started from that checkpoint. In conventional checkpointing computer systems, there have been problems and difficulties, in particular, concerning external input/output processings. When a process restarts execution from the last acquired checkpoint due to detection of a fault, states such as an address space of the process and context information in the processor are easily restored. However, restoration of states of external input devices was not so simple.

For instance, it was impossible to cancel writing operation to the files in the system. Consequently, in the prior art, when file writing operations are performed, reading and saving of data in the file up to that writing are performed in advance of the writing operation. After completion of the saving of the prior data, the writing operation writes new data to the file.

FIG. 15 explains the writing operation to a file in a conventional checkpointing computer system. In this example, a writing operation is performed. In this writing operation, data that is to be written on is read and saved as rollback information. Then, the writing operation is performed writing data to the file.

In this example, a process file having 4 bytes of data "ABCD" is acquired at a checkpoint of time t1. At time t2, a command is received to write "X" to the 1st byte position in the file (1). Before writing "X" to the 1st byte position of the file, original data "B" in the 1st byte position in the file is read out and saved as a roll back information (this operation is referred to as an "undo log") (2). After saving the roll back information, the data "X" is written into the 1st byte position of the file (3). When a fault occurs at time t3, the process is rolled back to the state of the last acquired checkpoint t1. Although the file has already been updated by "X" in the 1st byte position at time t3, the file state at the checkpoint t1 is restored by using the undo log (4). The undo log is destroyed at the time of the next checkpoint acquisition.

This method is also applicable to duplicated computer systems comprised of two computers, one as the working system (a primary computer) and the other as the standby system (a back-up computer). When a fault occurs in the primary computer, the back-up computer takes over the process by utilizing the roll back file information which was acquired at the last checkpoint.

As described above, the checkpointing computer system (no matter whether it be duplicated or not) can improve the reliability of a computer system by utilizing periodically acquired process states and the files. However, as explained above, when performing updates (for instance, writing of files), the conventional system and method have reduced efficiency because data must be read and logged before updating to the file.

SUMMARY OF THE INVENTION

Accordingly, it is an object of the present invention to provide a checkpoint based computer system and method for managing files for achieving a higher efficiency of updating files while maintaining a fault tolerant computer system.

It is another object of the present invention to provide a checkpoint computer system for uniting processes and a file management method for achieving a higher updating efficiency of files while maintaining a fault tolerant computer system.

It is a further object of the present invention to provide a duplicate computer system and file management method for achieving a higher updating efficiency of files while maintaining fault tolerance in the duplicate computer system.

It is a still further object of the present invention to provide a duplicate checkpointing computer system and method for updating data in a working system file when a process is aborted, by reading pre-update data from a standby system file for restoration of a working system file to allow re-execution of the aborted process from a last acquired checkpoint, thereby restoring normal processing for completion of the aborted process without delay, and improving file updating efficiency.

It is a still further object of the present invention to provide a computer system and a file management method which makes unnecessary the reading of pre-update data from files when performing routine file updates, and thus makes possible a significant improvement in file updating efficiency.

These and other objects are achieved according to the present invention by providing a computer system having a failure recovery function that periodically acquires checkpoints and restarts a process from a last checkpoint when a fault occurs.

Also, instead of restoring the working system file, it is also effective to re-execute the process from a checkpoint by using the standby system file, in which the whole update content indicated in the update information saved before the last checkpoint, is reflected. That is to say, continuation of processing is also guaranteed in such cases as re-starting when the working system file is not available due to a fault in the working system computer, for example. Therefore, availability of the system can be improved. Also, if the standby system file is updated on a third computer, it is possible to further improve system availability.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
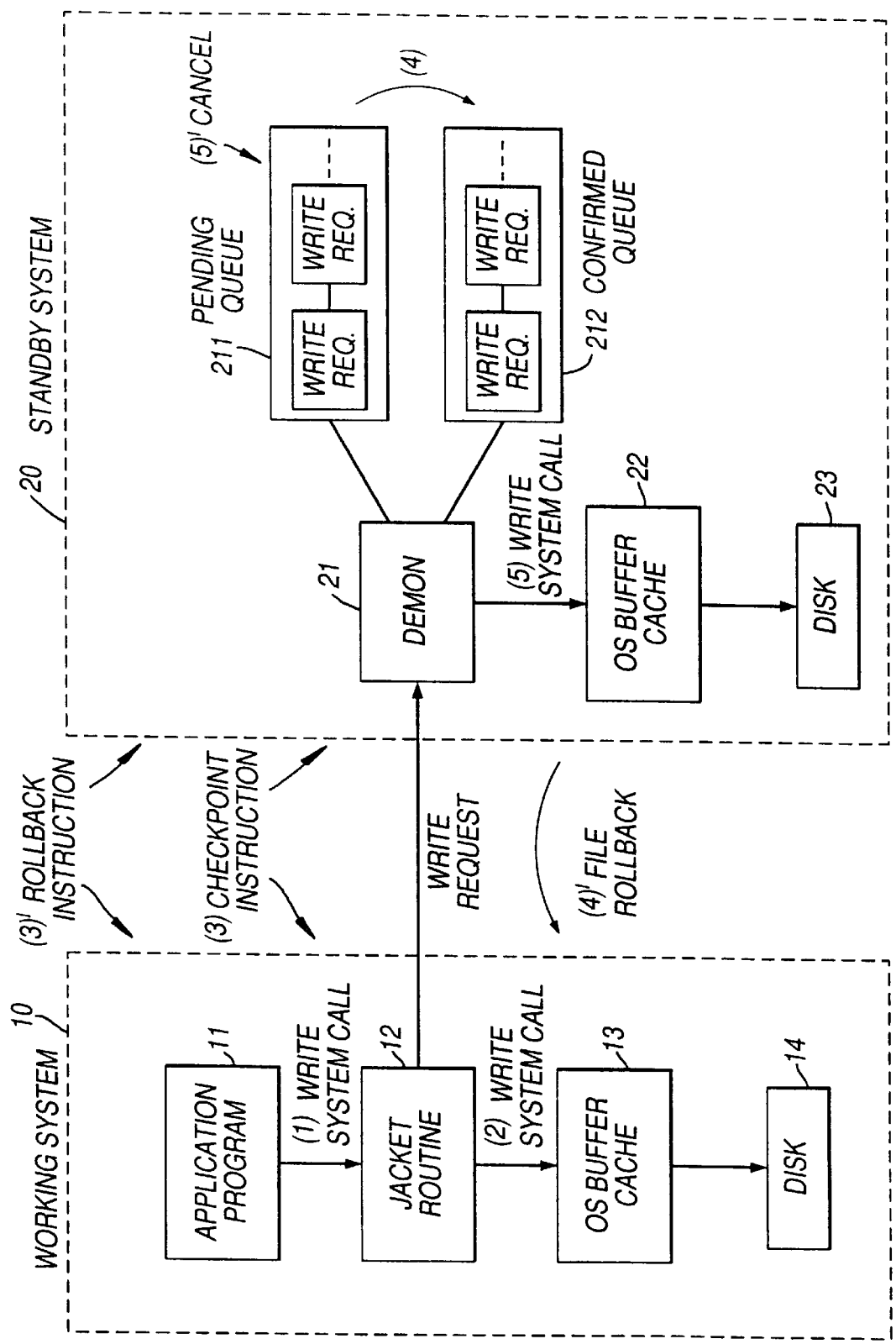
FIG. 1 is a block diagram for explaining the basic theory of the present invention.

Referring now to the drawings, wherein like reference numerals designate identical or corresponding parts throughout the several views, and more particularly to FIG. 1 thereof, there is illustrated a conceptual block diagram for explaining the basic theory of the present invention.

As shown in FIG. 1, the computer system according to the present invention takes as prerequisite a working system 10 (a multiplexed system, for example) and a standby system 20. The following is an explanation of their respective operations.

During Normal Processing:

(1) In the working system 10, an application program 11 issues a "write" system call.

(2) A Jacket routine 12 hooks the "write" system call and issues the "write" system call to an operating system of the working system. By this system call, a file on the disk 14 in the working system 10 is updated through the OS buffer cache 13. At the same time, it transmits that "write" request to the standby system 20. However, it is not necessary to transmit the "write" request to the standby system 20 immediately. It may be transmitted up to the next checkpoint acquisition. Also, the "Write" request received by the demon process 21 in the standby system 20 is not immediately executed, but is stored temporarily in a pending queue 211.

(3) When a designated checkpointing process is instructed, the working system 10 must complete transmission of all queued "Write" requests to the standby system 20.

(4) At the same time, in the standby system 20, any "Write" requests stored in the pending queue 211 are moved to a confirmed queue 212.

(5) The "Write" requests moved to the confirmed queue 212 are sequentially processed by the operating system of the standby system 20. Namely, the operating system updates a file on the disk 23 in the standby system 20 through the OS buffer cache 22. That is to say, in a file updating operation which is generated during normal processing, there is no waiting for completion of a process which reads out and sidetracks pre-update data.

During Rolling-back Process:

(3)' At times such as when a fault has occurred, the roll-back process is instructed in both working system 10 and standby system 20.

(4)' At this time, any "write" requests remaining in the working system 10 are all transmitted to the standby system 20. Then, all write requests stored in the confirmed queue 212 in the standby system 20 are executed. That is, all write requests are written to a file in the standby system 20. Also, any "write" requests stored in the pending queue 211 of the standby system are those which have been issued since the last checkpoint. Therefore, conversely, the pre-update data is read from a standby system file 23 with reference to the stored "write" requests. The working system file 14 is rolled-back by using the pre-update data read from the standby system file 23. By this means, both the working system file 14 and the standby system file 23 are placed into a state at the time of the last checkpoint acquisition.

(5)' Then, the standby system 20 cancels all the remaining "write" requests in the pending queue 211. By this means, it becomes possible to re-start the process from the time of the checkpoint.

The following are descriptions of some preferred embodiments of the present invention.

Figure 2:
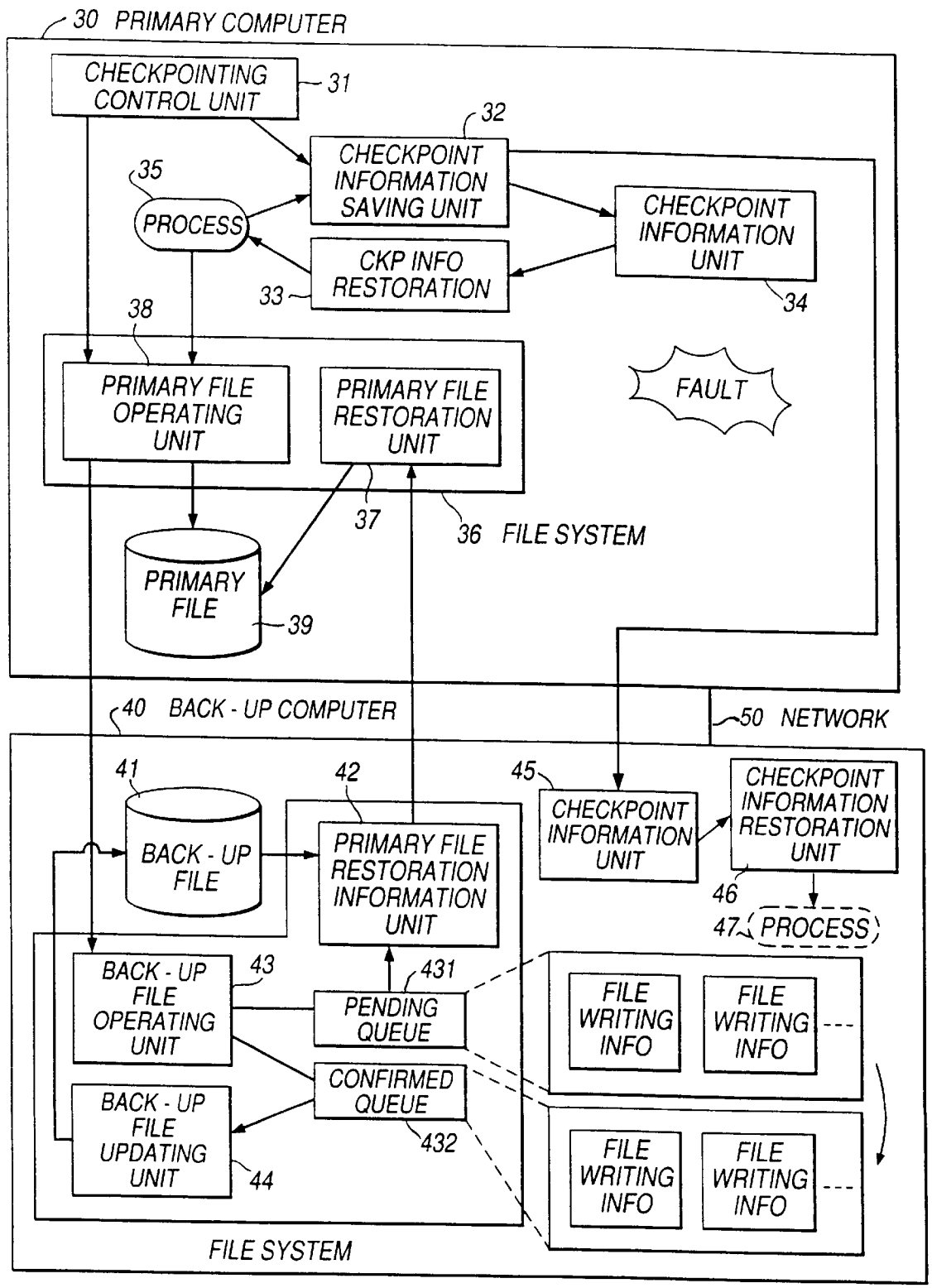
FIG. 2 is a block diagram showing the system composition of the computer system in a preferable first embodiment according to the present invention.

First Preferred Embodiment:

FIG. 2 illustrates a computer system of the first embodiment according to the present invention. As shown in FIG. 2, the computer system is duplicated as a primary computer 30 and a back-up computer 40. These primary and back-up computer systems are coupled through a network 50. The primary and back-up computers 30 and 40 are respectively provided with both the above-mentioned working system 10 and standby system 20. When the working system 10 is operating in either one of them, the standby system 20 is operating in the other.

Here, the case is described of the working system 10 on the primary computer 30 side and the standby system 20 on the back-up computer 40 side respectively. A process 35 is executed on the primary computer 30 and it updates duplicated files as a primary file 39 and a back-up file 41. The primary file 39 is provided in the primary computer 30, and the back-up file 41 is provided in the back-up computer 40. They are updated through a file system 36 in the primary computer 30 and a file system 48 in the back-up computer 40.

The file system 36 in the primary computer 30 contains a primary file operating unit 38 and a primary file restoration unit 37. The file system 48 in the back-up computer 40 contains a back-up file operating unit 43, a pending queue 431, a confirmed queue 432, a back-up file updating unit 44, and a primary file restoration information reading unit 42.

When the process 35 updates the duplicated files, it performs the updating operation through the primary file operating unit 38 and back-up file operating unit 43. If the process 35 performs a "write" corresponding to the duplicated files, the primary file 39 is immediately updated. However, the back-up file 41 is not updated at that point in time, and the "file writing information", or write request passes through the back-up file operating unit 43 and is saved in the pending queue 431 in the back-up computer 40.

Also, when the process 35 acquires a checkpoint, a checkpointing control unit 31 issues a checkpoint acquisition instruction to a checkpoint information saving unit 32 and a primary file operating unit 38. When the checkpoint information saving unit 32 receives the checkpoint acquisition instruction, it saves checkpoint information (e.g., address memory space and processor context) on the primary computer 30 and on the back-up computer 40. That is, the checkpoint information is saved in a checkpoint information unit 34 on the primary computer 30 and also saved in a checkpoint information unit 45 on the back-up computer 40.

At the same time, when the primary file operating unit 38 receives the checkpoint acquisition instruction, it causes the "file writing information" saved in a pending queue 431 to be moved to a confirmed queue 432 through the back-up file operating unit 43. The "file writing information", which is moved to the confirmed queue 432, is used for updating the back-up file 41 by the back-up file updating unit 44 after checkpoint acquisition, and is dumped after updating the back-up file 41. By this means, the same "write" operations as those which have been performed on the primary file 39 from a checkpoint onward are also performed on the back-up file 41.

In the case of the process 35 causing the occurrence of a fault, such as an abort, the process 35 is reexecuted on the primary computer 30 from the last acquired checkpoint, the address space and processor context having been restored by a checkpoint information restoration unit 37 on the primary computer 30.

Concerning the files, the update information for the back-up file 41 from the last checkpoint onward is still only saved as "file writing information" in the pending queue 431. Since it has not actually been updated, restoration is not required. However, restoration is required for the primary file 39 because updating has already been performed from the last checkpoint onward. Therefore, it is restored by reading the pre-update data from the back-up file 41, and writing the pre-update data to the primary file 39 based on the "file writing information" saved in the pending queue 431. After this operation, the "file writing information" saved in the pending queue 431 is dumped. In the case of any "file writing information" being saved in the confirmed queue 432, the above-mentioned restoration process starts after completion of writing the confirmed queue "file writing information" to the back-up file 41.

On the other hand, in the case of the primary computer 30 or an operating system which controls the primary computer 30 causing the generation of a fault such as "system down", the process 35 is re-executed on the back-up computer 40 from the last checkpoint acquisition, the address space and the processor context are restored to the process 47 by a checkpoint information restoration unit 46 on the backup computer 40.

Concerning the files, the update for the back-up file 41 from the checkpoint onward is still only saved in the pending queue 431, and since it has not actually been updated, restoration is not required.

It is possible to optimize the transmission of this "file writing information" from the primary computer 30 to the back-up computer 40. In the case of the primary computer 30 not having gone down when a fault has occurred, the primary file 39 is restored, and processing is restarted from the checkpoint by using the primary file 39. On the other hand, in the case of the primary computer 30 going down when a fault has occurred, processing is restarted from the checkpoint by using the back-up file 41.

For that reason, there is no requirement for the immediate transmission of the "file writing information" from the primary file operating unit 38 to the back-up file operating unit 43. That is to say, this "file writing information" may be transmitted up to the next checkpoint acquisition. Therefore, in consideration of transmission efficiency, it is possible to store the "file writing information" temporarily in the primary file operating unit 38 and to batch-transmit it to the back-up file operating unit 43, using information relating to a specified volume of stored information, a specified elapsed time, or a checkpoint sampling request as triggers.

Figure 3:
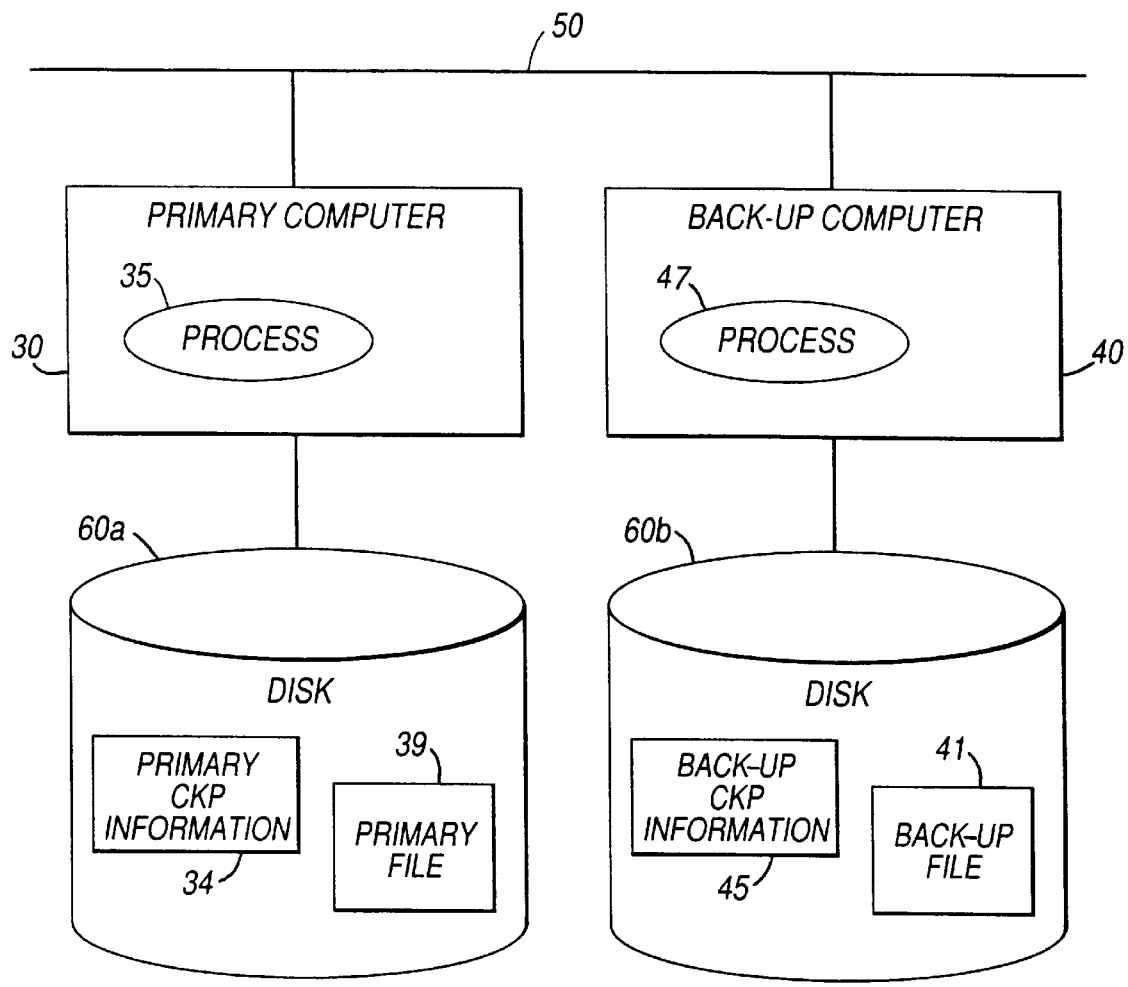
FIG. 3 is a schematic diagram illustrating the computer system of the first embodiment according to the present invention.

FIG. 3 shows an application of the computer system of the first embodiment. The computers are duplicated as a primary computer 30 and a back-up computer 40. A disk device 60a is connected to the primary computer 30, and a disk device 60b is connected to the back-up computer 40. The process 35 in FIG. 2 is being executed on the primary computer 30. Also, the file which process 35 is accessing is duplicated as a primary file 39 and a backup file 41. These are respectively provided in the disk device 60a and the disk device 60b.

Also, for the checkpoints, the checkpoint information is stored on both the primary computer 30 as a primary checkpoint information 34 and the back-up computer 40 as a back-up checkpoint information 45. In this embodiment, these checkpoints are held in the respective disk devices 60a and 60b. It is also possible to store them in the memories of the computer system.

If a fault such as "system down" is detected in the primary computer 30 or in the operating system which controls the primary computer 30, a process 47 is reexecuted on the back-up computer 40 by using back-up checkpoint information 45 and the back-up file 41 in the disk 60b.

Also, it is possible to have multiple copies of primary file 39 or back-up file 41 and to produce a triplicate or greater file system. If, for instance, it is a triplicate file system, combinations such as the following can be considered.

(1) 2 primary files and 1 back-up file
(2) 1 primary file and 2 back-up files

Figure 4:
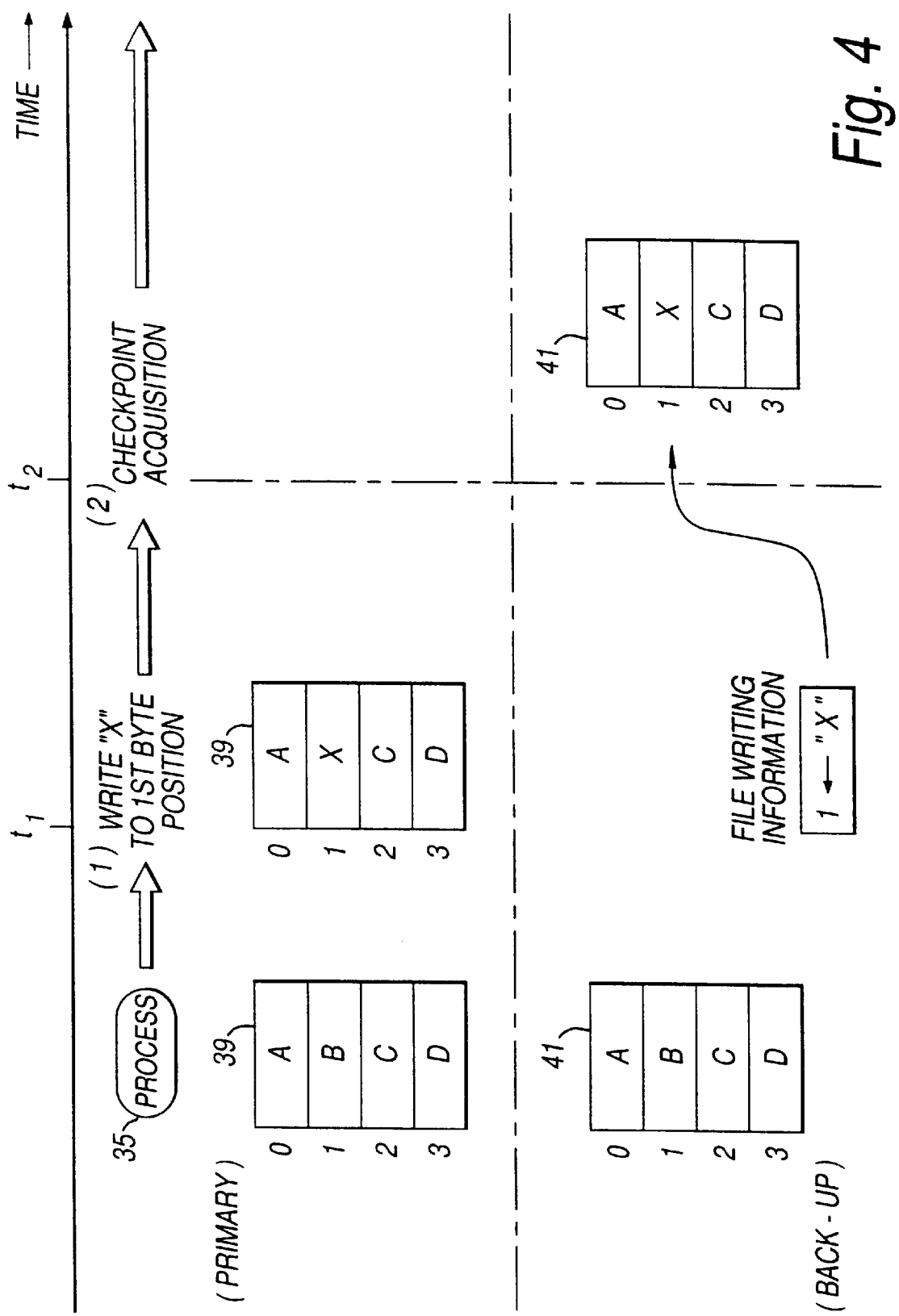
FIG. 4 is a schematic diagram illustrating how a file is updated in the first embodiment according to the present invention.

FIG. 4 shows a file updating operation in this embodiment. In this example, a process 35 which is executing on the primary computer 30 has written "X" to the 1st byte position at a time t1 in a duplicated file, i.e., a primary file 39 on the primary computer 30 and a back-up file 41 on the back-up computer 40, the duplicated files each containing 4 bytes of data "ABCD" prior to writing "X"(1). Although the primary file 39 is immediately updated by this means, the back-up file 41 is not immediately updated, and saves only the "file writing information" pertaining to the writing of "X".

After this, the execution of the "file writing information" pertaining to the writing of "X" is confirmed at a checkpoint acquisition time t2 (2). Then, updating of the back-up file 41 is executed from the time t2 onward based on the confirmed "file writing information".

Figure 5:
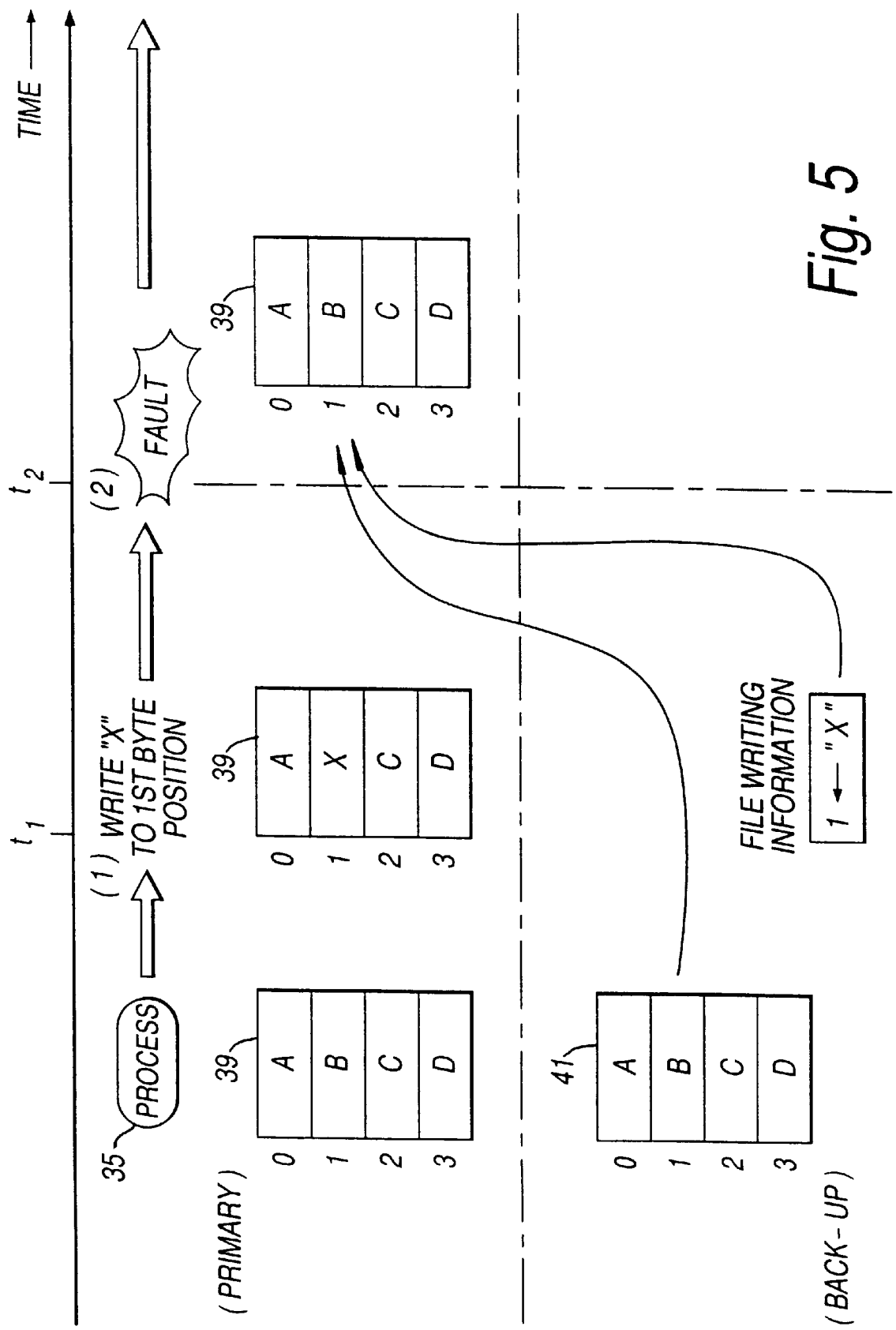
FIG. 5 is a schematic diagram illustrating how the primary file is restored in the first embodiment of the present invention when a fault occurs.

FIG. 5 depicts how a primary file is restored when a fault occurs in this embodiment. In this example, the process 35 which is executing on the primary computer 30 has written "X" to the 1st byte position at the time t1 in a duplicated file, i.e., the primary file 39 on the primary computer 30 and the back-up file 41 on the back-up computer 40 which have 4 bytes of data "ABCD" (1). Although the primary file 39 is immediately updated by this means, the back-up file 41 is not immediately updated, and saves only the "file writing information".

After this, a fault occurs at the time t2 (2). Since the primary file 39 was updated at the time t1, there is a requirement to restore it. However, since the back-up file 41 has not yet been updated, there is no requirement to restore that. Accordingly, the data needed for restoring primary file 39 is determined by the "file writing information" saved at the time t1. Therefore, the primary file 39 is restored by reading the data at the position indicated by the pending "file writing information" from the back-up file 41 and writing it to the primary file 39.

Then, by using a checkpoint acquired on the primary computer 30, the process 35 is re-executed on the primary computer 30. This re-executed process 35 uses the restored primary file 39.

Figure 6:
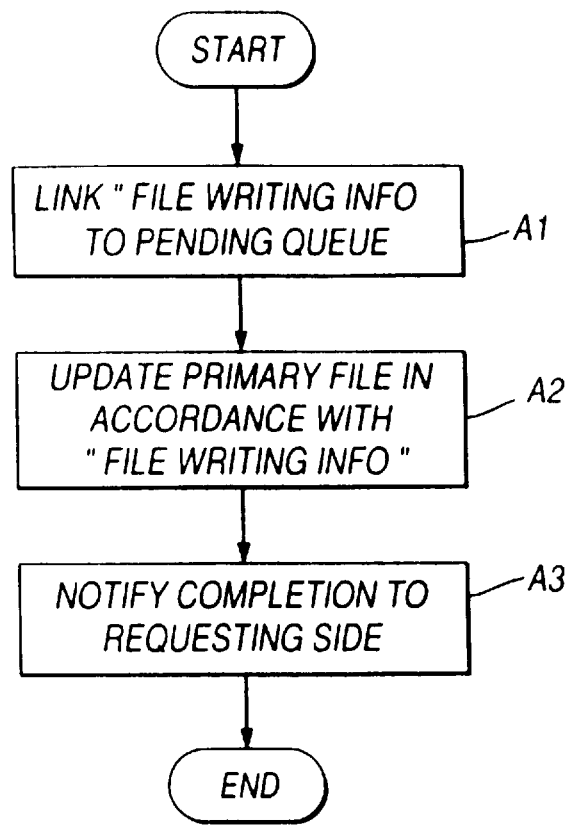
FIG. 6 is a flow-chart that illustrates the processing of a file-writing operation in the first embodiment of the present invention.

FIG. 6 is a flowchart showing the processing flow when a file write instruction is received by the primary file operating unit. At first, the "file writing information" is saved and it is linked to the pending queue 431 (Step A1). Then, the primary file 39 is updated in accordance with the "file writing information" (Step A2). At this time, the file writing operation is completed and completion notification is sent to a requesting side (Step A3).

Figure 7:
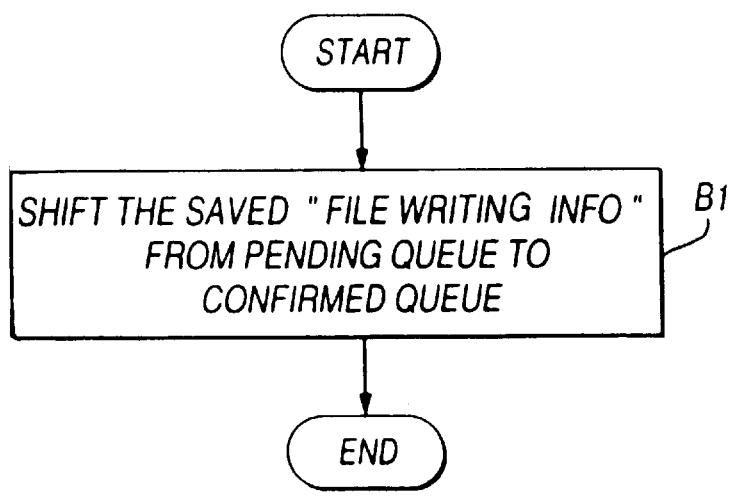
FIG. 7 is a flow-chart that illustrates processing of a checkpoint acquisition operation in a file operating unit of the first embodiment of the present invention.

FIG. 7 is a flow-chart showing the processing flow when a checkpoint acquisition instruction has been received by the file operating unit. As shown in Step B1, the saved "file writing information" is moved from the pending queue 431 to the confirmed queue 432.

Figure 8:
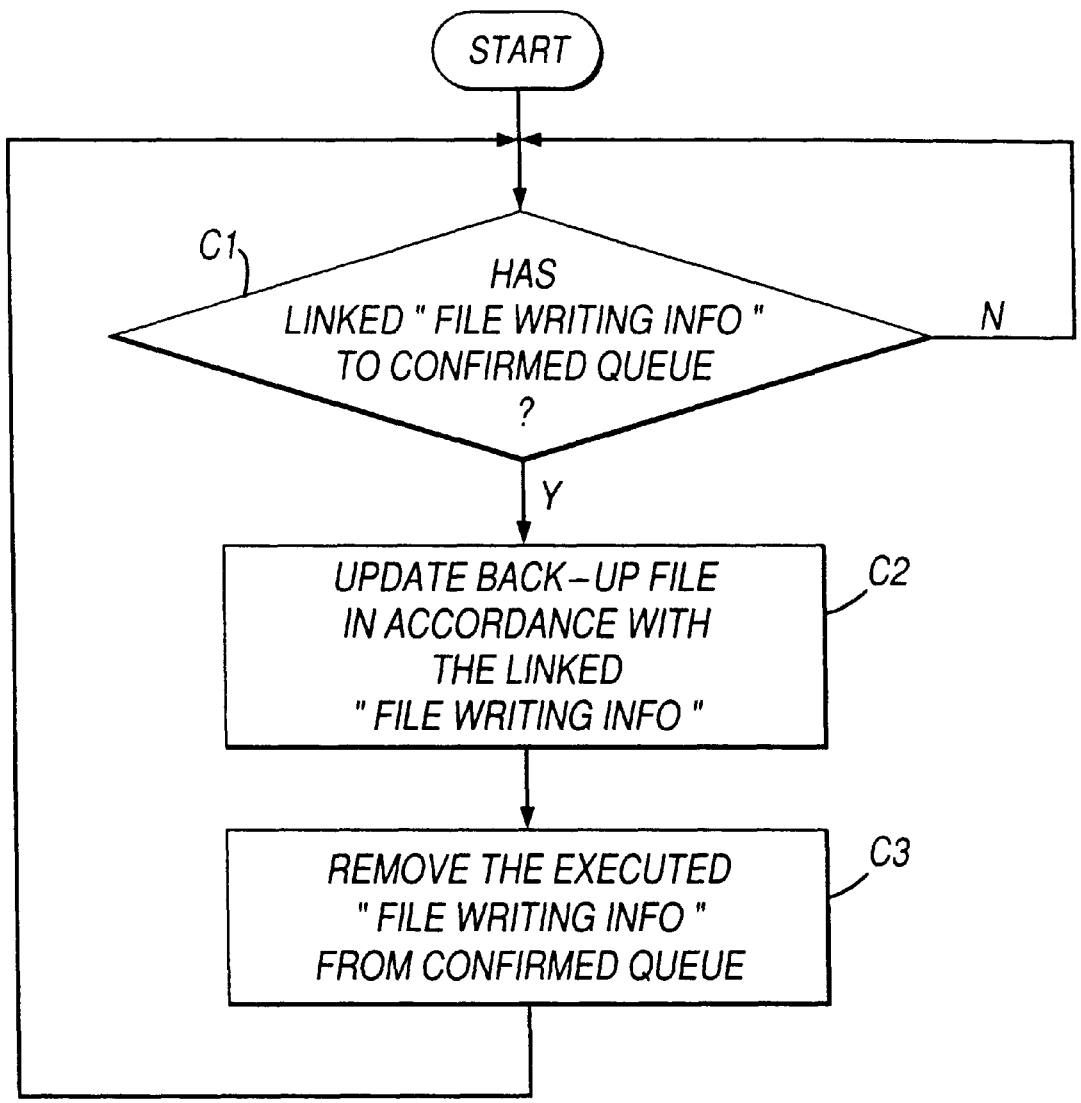
FIG. 8 is a flow-chart that illustrates processing of the file updating operation in a back-up unit of the first embodiment of the present invention.

FIG. 8 is a flow-chart showing the processing flow of the back-up file updating unit. At first, it checks whether or not the "file writing information" is linked to the confirmed queue 432 (Step C1). If it is not so linked (N branch of Step C1), the back-up file updating unit 44 continues checking. If it is so linked (Y branch of Step C1) it updates the back-up file 41 based on the "file writing information" linked in the confirmed queue 432 (Step C2). Then, it removes the executed "file writing information" from the confirmed queue 432 (Step C3).

Figure 9:
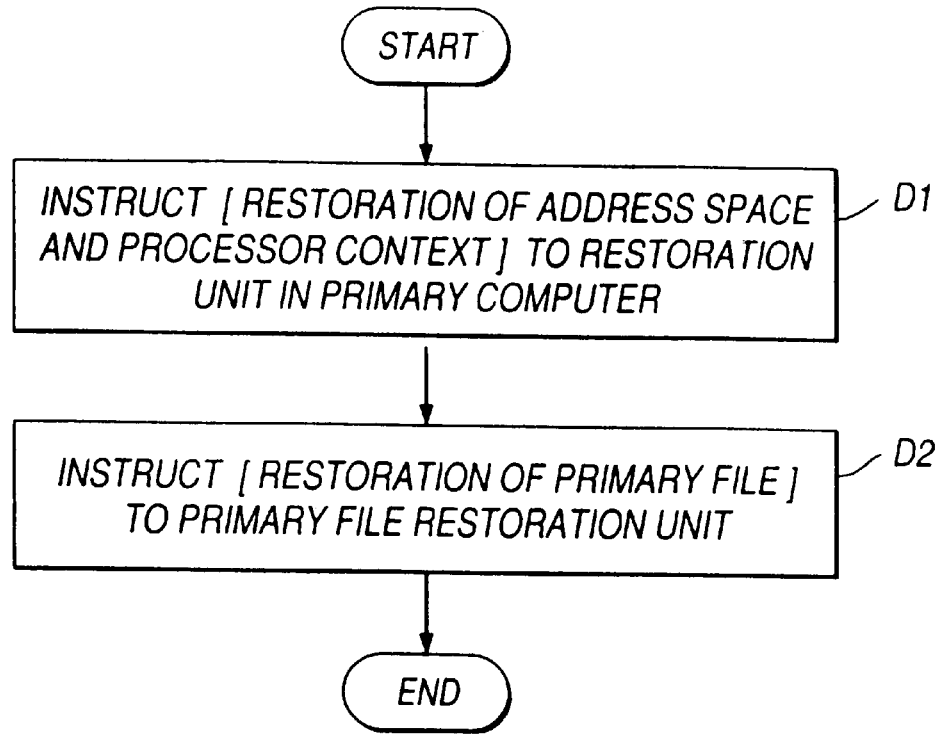
FIG. 9 is a flow-chart that illustrates processing of a restarting operation from the last acquired checkpoint in the primary computer when a fault, such as an abort, has occurred in the process of the first embodiment of the present invention.

FIG. 9 is a flow-chart showing the processing flow in the case of a fault such as an abort having occurred in the process 35, and the process 35 being re-executed on the primary computer 30 from the last checkpoint acquisition. When a fault occurs in the process 35, the checkpoint information restoration unit 33 in the primary computer 30 is instructed to "restore address space and processor context" (Step D1). Next, the primary file restoration unit 37 is instructed to "restore primary file" (Step D2).

Figure 10:
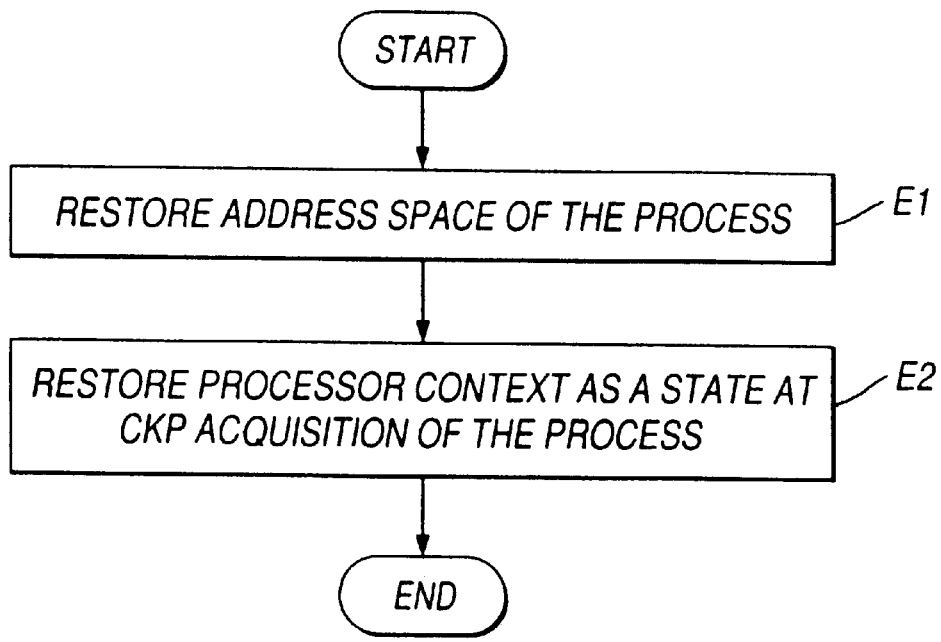
FIG. 10 is a flow-chart illustrating the process of restoring address space and processor context in the primary computer of the first embodiment of the present invention.

FIG. 10 is a flow-chart showing the processing flow in the case of the checkpoint information restoration unit 33 in the primary computer 30 having been instructed to "restore address space and processor context". At first, the address space of the process 35 is restored (Step E1). Then, the state of the processor context at the time of checkpoint acquisition of the process 35 is restored (Step E2).

Figure 11:
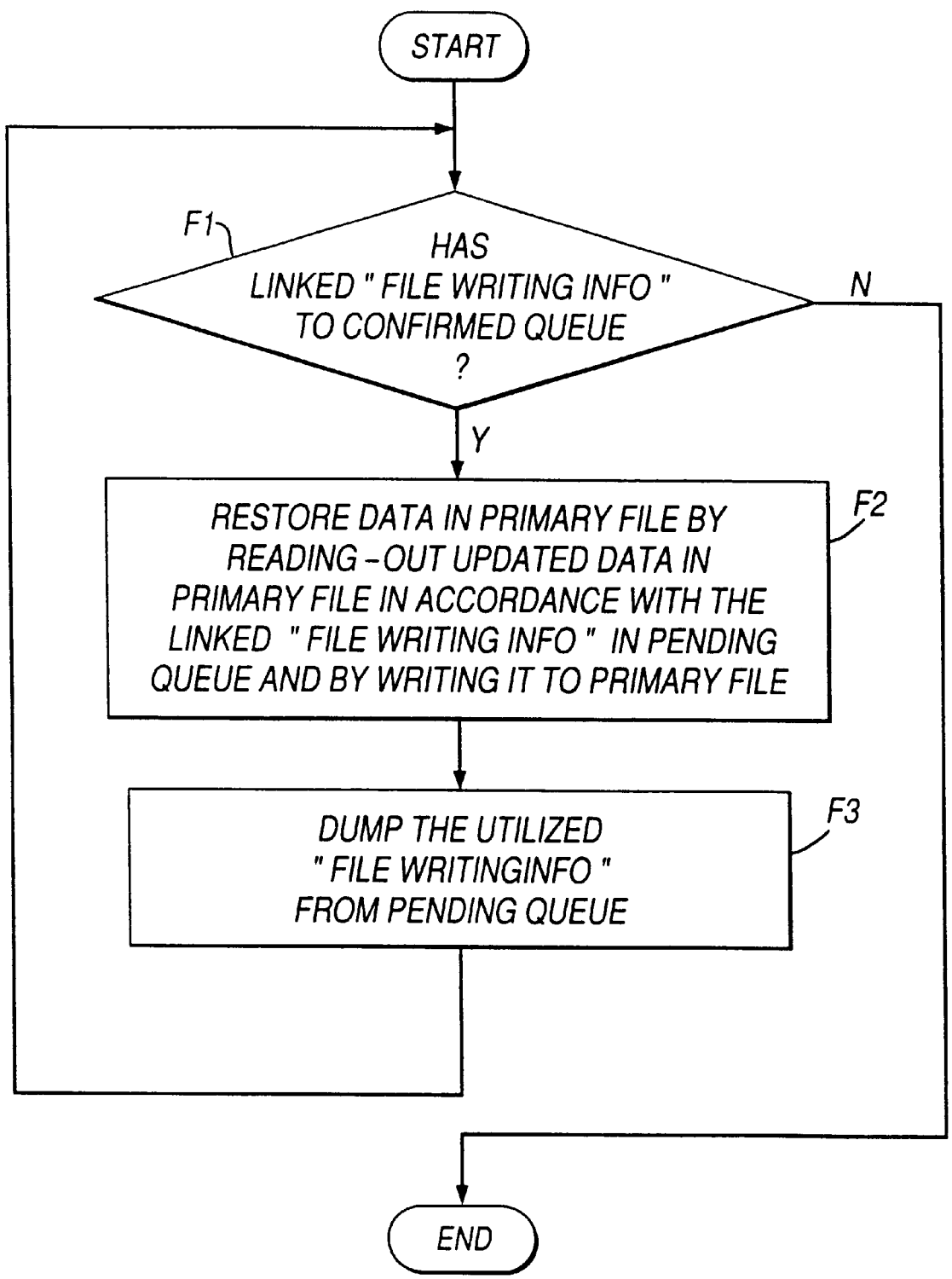
FIG. 11 is a flow-chart illustrating the process of restoration of the primary file in the first embodiment of the present invention.

FIG. 11 is a flow-chart showing the processing flow in the case of the primary file restoration unit 37 having been instructed to "restore primary file". At first, it checks whether or not the "file writing information" is linked to the pending queue 431 (Step F1). If the "file writing information" is so linked (Y branch of Step F1), data corresponding to the "file writing information" which has been linked to the pending queue 431, and has been updated in a corresponding location in the primary file 39, is read from the back-up file 41. The primary file 39 is then restored with the data corresponding to the "file writing information" that has been read from the backup file 41 by writing it to the primary file 39 (Step F2). Then, the "file writing information" which was used in the restoration is removed from the pending queue 431 (Step F3). This process is repeated until the primary file 39 has been updated by all data corresponding to the "file writing information" linked to the pending queue 431.

In the case of a fault, such as "system down", occurring in the primary computer 30 or the operating system which controls the primary computer 30, the process 35 is re-executed on the back-up computer 40 from the last acquired checkpoint. In this case, the process continues in the back-up file 41.

Figure 12:
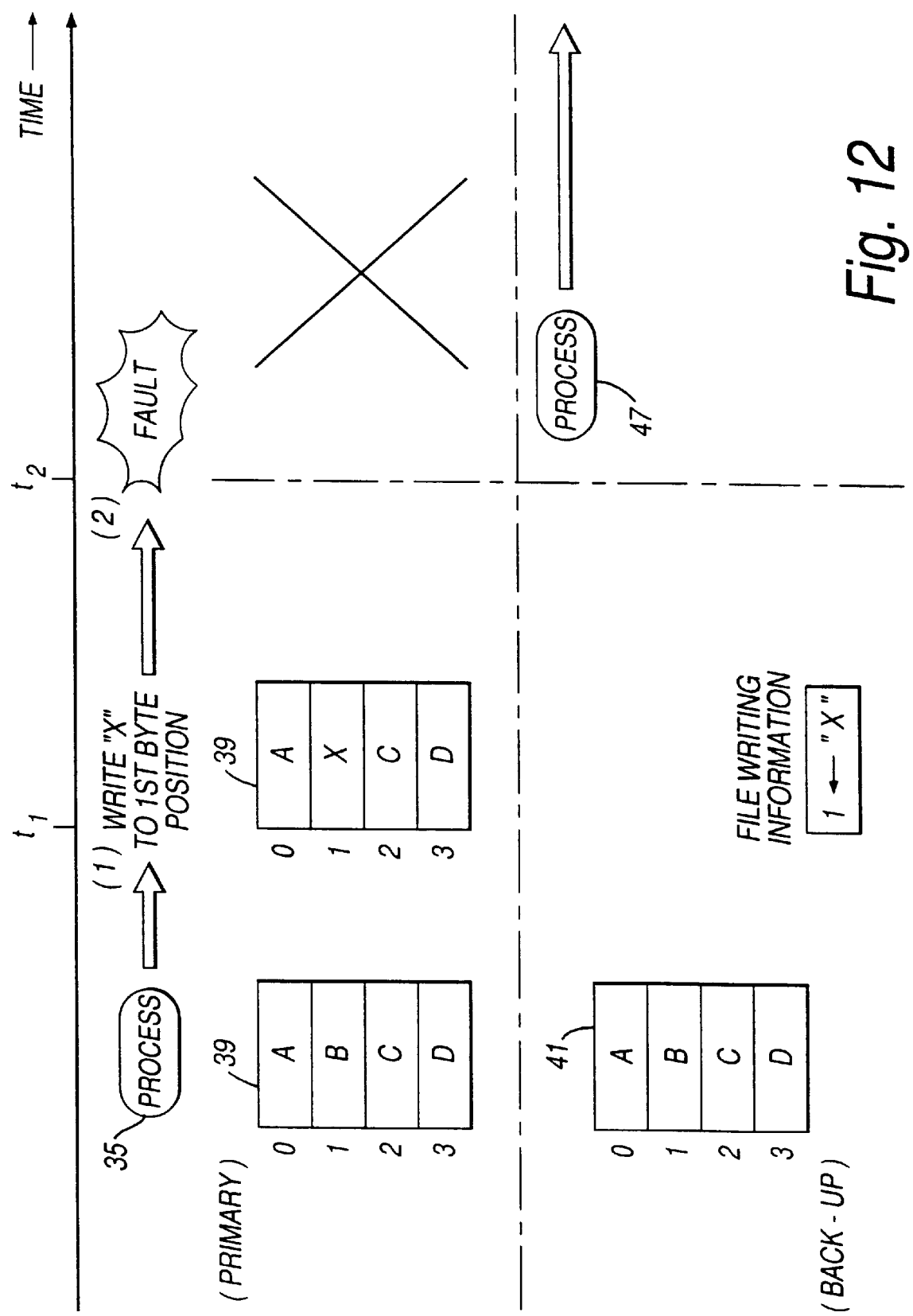
FIG. 12 is a drawing that illustrates how the back-up file takes over processing when a fault has occurred in the first embodiment according to the present invention.

FIG. 12 shows a state in which the process is continued in the back-up file 41 after such a fault has occurred. In this example, the process 35 which is executing on the primary computer 30 has written "X" to the position of first byte at a time t1 in a duplicated file, e.g., the primary file 39 on the primary computer 30 and the back-up file 41 on the back-up computer 40 which stores 4 bytes of data "ABCD", respectively (1). In this example, the primary file 39 is immediately updated, but the back-up file 41 saves only the "file writing information" without immediately updating.

After this, a fault occurs in the primary computer 30 at a time t2 (2). In this case, the process 47 is re-executed on the back up computer 40 by using the checkpoint which has been acquired on the back-up computer 40. At this time, the process 47 continues processing by using the back-up file 41. Although the primary file 39 was updated at the time t1, the back-up file 41 has not yet been updated. Consequently, during reexecution of the process 47 on the back-up computer 40, the back-up file 41 can be used as it stands.

In the case of a back-up file having been truncated through the occurrence of a fault, the initial state such as shown in FIG. 1, can be reproduced afterwards by producing a new back-up file. Recovery processing is possible, even if the fault occurs again.

In the case of processing being continued with a backup file due to the occurrence of a fault, and the processing being re-executed from a checkpoint, afterwards, the initial state as shown in FIG. 1 can once again be reproduced by taking the back-up file as the primary file and producing a new back-up file. The recovery process is possible even if the fault re-occurs. Three methods of producing a new back-up file are now presented.

(1) In the case of the back-up file being re-connected by saving the primary file update information and data after truncating the back-up file, that primary file update information and data after truncation are reflected in the back-up file.

(2) The primary file is copied to the back-up file. However, in the case of the primary file being updated during copying also, the primary file update information and data are reflected in the back-up file at the same time as copying starts.

Moreover, the following method which is a combination of these two methods is also effective.

(3) Taking the re-connection of the back-up file which was truncated (or the primary file before the occurrence of the fault) as a prerequisite, the primary file update information and data after the back-up file has been truncated is saved until a specified time has elapsed, as if method (1) were adopted. After the specified time has elapsed, method (1) is abandoned, and the saving to the primary file update information and data after the truncation of the back-up file stops, so that method (2) can be adopted. Also, in the case of reconnecting files other than the truncated back-up file, the saving of the primary file update information and data after the truncation of the back-up file is stopped, and method (2) is adopted.

Second Embodiment:

The following is a description of a second preferred embodiment of the present invention. In the first embodiment, a duplicated computer system was described. However, the present invention is effective even applied to file systems on computers which are not duplicated. Thus, in the second embodiment, the present invention as applied to a file system on a single computer is explained in relation to FIG. 13.

Figure 13:
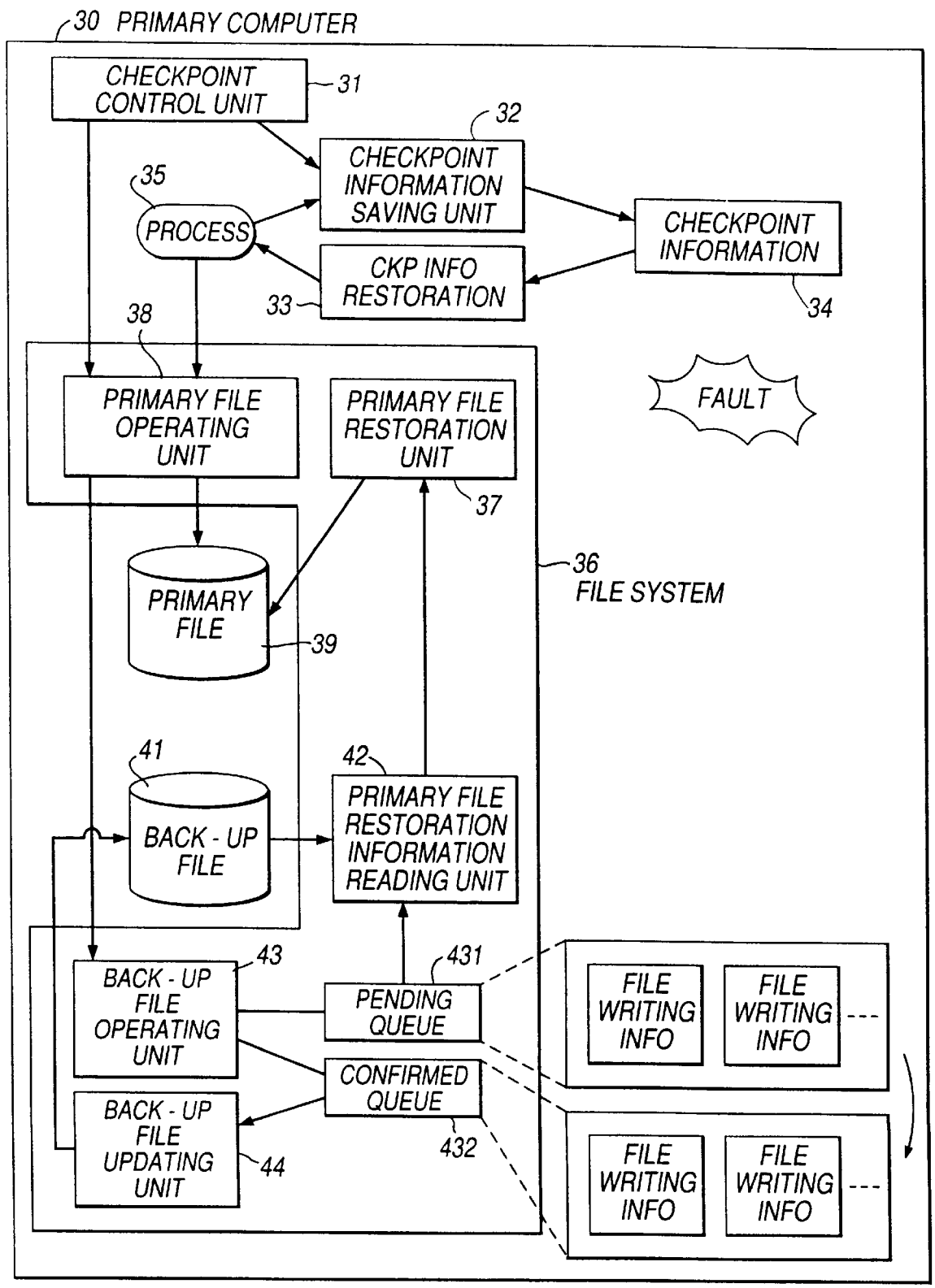
FIG. 13 is a block diagram illustrating the composition of the computer system of a second embodiment according to the present invention.

In FIG. 13, there is only one computer 30. Process 35 is executed on the computer 30, and updates a file which is duplicated as a primary file 39 and a back-up file 41. The primary file 39 and the back-up file 41 are both provided in the computer 30, and they are updated through a file system 36.

The file system 36 contains a primary file operating unit 38, a primary file restoration unit 37, a back-up file operating unit 43, a pending queue 431, a confirmed queue 432, a back-up file updating unit 44 and a primary file restoration information reading unit 42.

When process 35 updates the duplicated files, it does so through the primary file operating unit 38 and the back-up file operating unit 43. When process 35 performs a "write" operation to the duplicated files, the primary file 39 is updated as it stands. However, the back-up file 41 is not updated, and the "file writing information" is saved in the pending queue 431 through the back-up file operating unit 43.

Also, when process 35 acquires checkpoints, a checkpoint control unit 31 issues checkpoint acquisition instructions to a checkpoint information saving unit 32 and a primary file operating unit 38. When the checkpoint information saving unit 32 receives a checkpoint acquisition instruction, it acquires the checkpoint information 34 consisting of address space and processor context in the computer 30.

At the same time, when the primary file operating unit 38 receives the checkpoint acquisition instruction, any "file writing information" which has been saved in the pending queue 431 is shifted to the confirmed queue 432 through the back-up file operating unit 43. The "file writing information" which has been shifted to the confirmed queue 432 is used by a back-up file updating unit 44 for updating the back-up file 41 after checkpoint acquisition, and is dumped after the updating of the back-up file 41. By doing this, a "write" operation is performed for the back-up file 41 in the same way as that performed previously for the primary file 39.

In the case of a fault such as an "abort" occurring, and the process 35 being re-executed from the last acquired checkpoint, the address space and the processor context are restored by the checkpoint information restoration unit 33 in the computer 30.

Concerning the files, for the back-up file 41, the updating from the checkpoint onward is still only saved as "file writing information" in the pending queue 431, and restoration is not required since it has not actually been updated. However, restoration is required for the primary file 39 since updating has already been performed from the checkpoint onward. Therefore, the data representative of data in the primary file 39 before updating is read from the back-up file 41 based on the "file writing information" saved in the pending queue 431. This pre-update data restores the primary file 39 by being written to the primary file 39. After writing to the primary file 39, the "file writing information" which is saved in the pending queue 431 is dumped. When the "file writing information" is saved in the confirmed queue 432, the above-mentioned restoration process starts after updating the back-up file 41 in accordance with the confirmation queue "file writing information".

Figure 14:
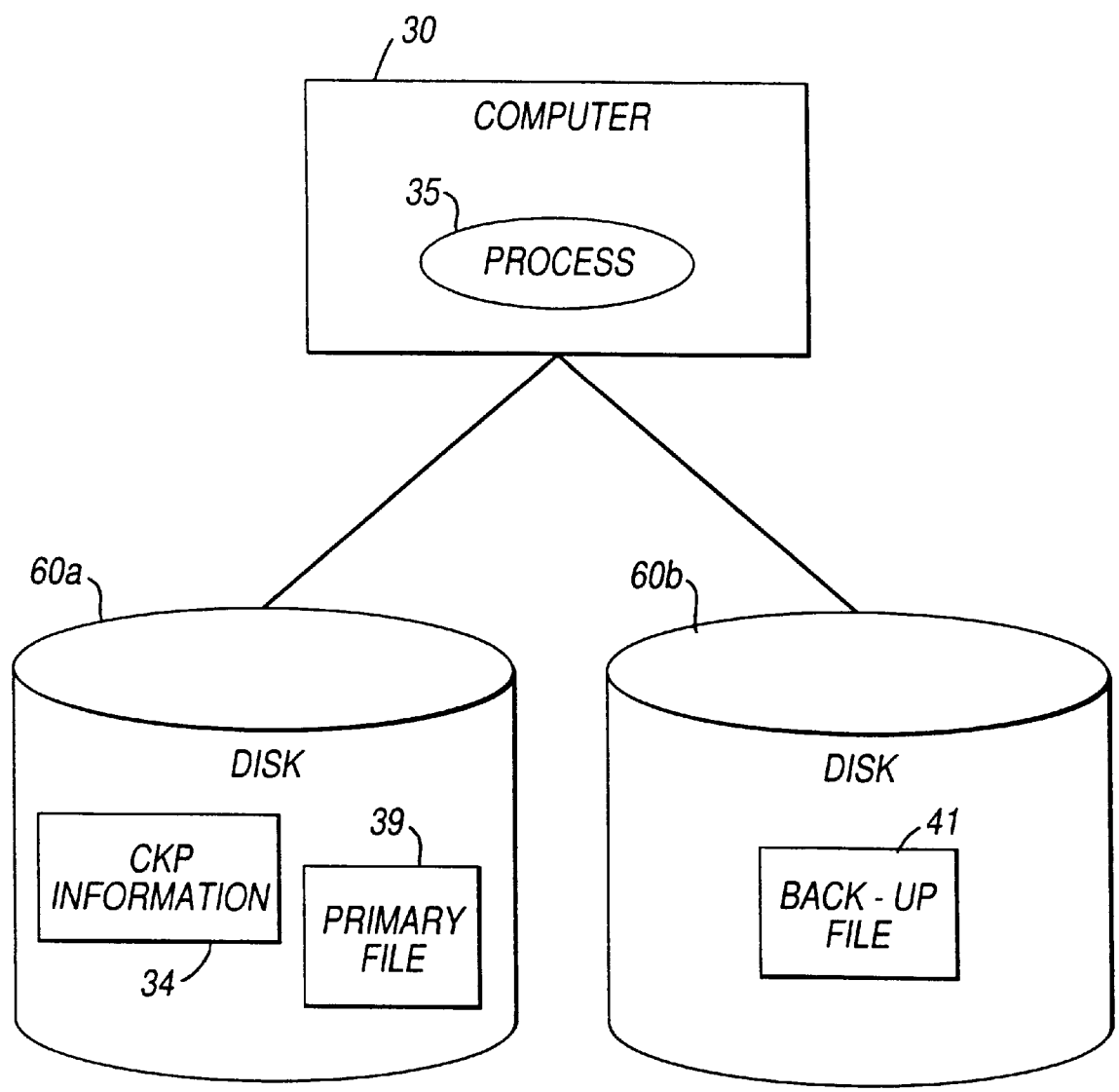
FIG. 14 is a schematic diagram illustrating composition of the computer system of the second embodiment according to the present invention.
Figure 15:
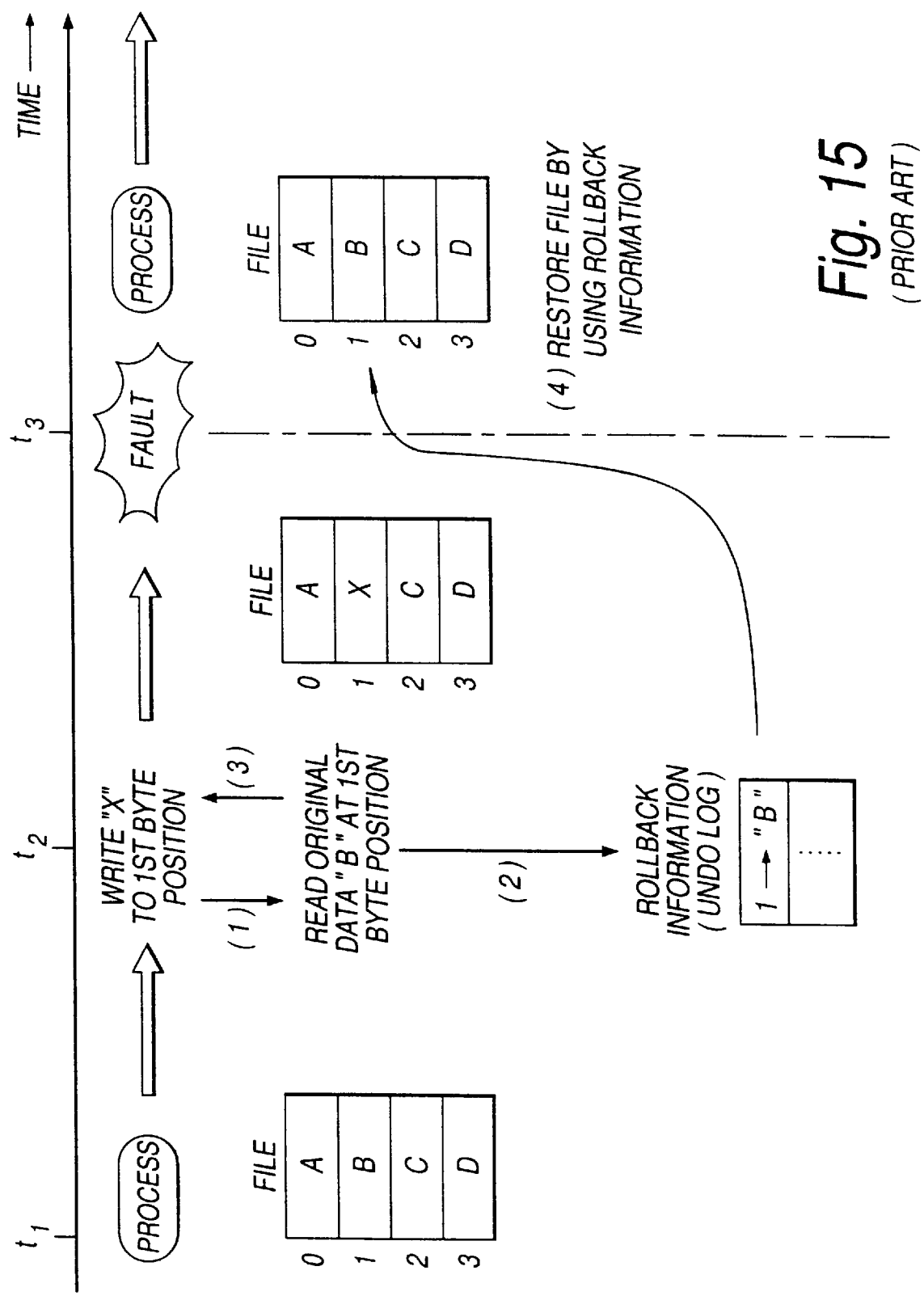
FIG. 15 is a schematic diagram that explains a data writing operation into file of a conventional checkpointing computer system.

FIG. 14 shows the schematic construction of a computer system to which the second embodiment is applied. The unduplicated computer 30 is coupled to a disk device 60a and a disk device 60b. Process 35 is executed in the computer 30. The process 35 accesses the duplicated files of a primary file 39 and a back-up file 41 which are respectively provided in the disk device 60a and the disk device 60b.

By applying the present invention in this way, execution continues while periodically saving the states of the process address space and the processor context as checkpoint information. When a fault occurs, the process is re-executed from the last acquired checkpoint. In a system in which such countermeasures against faults are taken, faults are more easily recovered from, and file updating performance is substantially improved.

The file management method stated in the above embodiments can be installed and distributed on floppy disks, optical disks, semiconductor memories, etc., as programs to be executed on computers.

As described above in detail, according to the present invention, when a process requires updating of a file, updating information ("file writing information") is saved and, at the same time, only the primary file is immediately updated. After a checkpoint has been acquired, the updating content shown by that saved update information is caused to be reflected in the back-up file. Then, when the process aborts, all the pre-update data which corresponds to the data which has been updated since the last acquired checkpoint are read from the back-up file, based on the saved updating information. The primary file is restored to its state at the time of the checkpoint by using the preupdate data read from the backup file, and re-execution of the process starts. It is also possible to start the re-execution of a process by using the back-up file.

In the computer system according to the present invention, it is possible to achieve recovery of a file at the time of a fault without delaying normal processing for completion of a process such as the reading out and side-tracking of pre-update data when updating a file. Thus, it is possible to very significantly improve file updating performance without loss of reliability of the computer system.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A duplicated computer system comprising:
   a working computer system including a working external storage file system;
   a standby computer system including a standby external storage file system;
   a checkpoint information unit for performing checkpoint acquisition by collecting checkpoint information needed for re-starting an application process on said working computer system at a checkpoint and saving said checkpoint information in both said working computer system and said standby computer system; and
   an update process executed on said working computer system for updating both the working external storage file system and the standby external storage file system;
   wherein:
      said update process, upon receipt of a file write command initiated by said application process, updates said working external storage file system in accordance with said file write command, saves file update information pertaining to said file write command on said standby computer system, and notifies said application process upon completion of saving said file update information and updating said working external storage file system, and
      said update process, upon receipt of a checkpoint command, updates said standby external storage file system in accordance with said file update information saved on said standby computer system.

2. The duplicated computer system according to claim 1, wherein said working computer system includes an update information buffer for buffering said file update information on said working computer system and batch-transmitting said file update information to said standby computer system until a next checkpoint acquisition occurs.

3. The duplicated computer system according to claim 1, further comprising a restoration unit that, after interruption of said application process, reads pre-update data corresponding to said file update information saved on said standby external storage file system, restores said working external storage file system to a state at a last checkpoint by writing said pre-update data to said working external storage file system, and re-executes said application process from the last checkpoint.

4. The duplicated computer system according to claim 1, further comprising a backup file operating unit that, after interruption of said application process, deletes any update information which has been saved from a last checkpoint onward, updates said standby external storage file system according to file update information saved prior to the last checkpoint, and re-executes the application process on said standby computer system from said last checkpoint.

5. The duplicated computer system according to claim 1, further comprising a backup file operating unit that, after a fault occurs in either the working computer system or an operating system which controls the working computer system, deletes any update information saved from a last checkpoint onward, updates said standby external storage file system according to file update information saved prior to the last checkpoint, and re-executes the application process on said standby computer system from said last checkpoint.

6. The duplicated computer system according to claim 1, wherein when a fault occurs in one of said standby computer system and an operating system which controls said standby computer system, said checkpoint information unit stops saving said checkpoint information to said standby computer system and said update process stops saving said file update information to said standby computer system.

7. The duplicated computer system according to claim 1, further comprising a backup file operating unit that, after a fault occurs in said working external storage file system, deletes any update information which has been saved from a last checkpoint onward, updates said standby external storage file system according to file update information saved prior to the last checkpoint, and re-executes the application process on said standby computer system from said last checkpoint.

8. The duplicated computer system according to claim 1, wherein when a fault occurs in said standby external storage file system, said checkpoint information unit stops saving said checkpoint information to said standby computer system and said update process stops saving said file update information to said standby computer system.

9. The duplicated computer system according to claim 1, further comprising:
   a third computer system; and
   a backup file operating unit that, upon a truncation of said standby external storage file system, copies said standby external storage file system onto said third computer system.

10. The duplicated computer system according to claim 1, further comprising a primary file restoration unit that provides a current copy of said standby file system on said working system when re-execution of said application process is to be performed from a last checkpoint by copying said standby file system to said working computer system.

11. The duplicated computer system according to claim 2, further comprising a restoration unit that, after interruption of said application process, reads pre-update data corresponding to said file update information saved on said standby external storage file system, restores said working external storage file system to a state at a last checkpoint by writing said pre-update data to said working external storage file system, and re-executes said application process from the last checkpoint.

12. The duplicated computer system according to claim 2, further comprising a backup file operating unit that, after interruption of said application process, deletes any update information which has been saved from a last checkpoint onward, updates said standby external storage file system according to file update information saved prior to the last checkpoint, and re-executes the application process on said standby computer system from said last checkpoint.

13. The duplicated computer system according to claim 2, further comprising a backup file operating unit that, after a fault occurs in either the working computer system or an operating system which controls the working computer system, deletes any update information saved from a last checkpoint onward, updates said standby external storage file system according to file update information saved prior to the last checkpoint, and re-executes the application process on said standby computer system from said last checkpoint.

14. The duplicated computer system according to claim 2, wherein when a fault occurs in one of said standby computer system and an operating system which controls said standby computer system, said checkpoint information unit stops saving said checkpoint information to said standby computer system and said update process stops saving said file update information to said standby computer system.

15. The duplicated computer system according to claim 2, further comprising a backup file operating unit that, after a fault occurs in said working external storage file system, deletes any update information which has been saved from a last checkpoint onward, updates said standby external storage file system according to file update information saved prior to the last checkpoint, and re-executes the application process on said standby computer system from said last checkpoint.

16. The duplicated computer system according to claim 2, wherein when a fault occurs in said standby external storage file system, said checkpoint information unit stops saving said checkpoint information to said standby computer system and said update process stops saving said file update information to said standby computer system.

17. The duplicated computer system according to claim 2, further comprising:
a third computer system; and
a backup file operating unit that, upon a truncation of said standby external storage file system, copies said standby external storage file system onto said third computer system.

18. The duplicated computer system according to claim 2, further comprising a primary file restoration unit that provides a current copy of said standby external storage file system on said working system when re-execution of said application process is to be performed from a last checkpoint by copying said standby file system to said working computer system.

19. A duplicated computer system, comprising:
a working system including a working system computer;
a standby system including a standby system computer;
a checkpoint control unit for collecting checkpoints including information for re-starting processes executed on said working system computer, and saving said checkpoints on the computers of both said working system and said standby system; and
a file management system which maintains files to be updated by said processes executed on said working system computer in duplicate on both said working system computer and said standby system computer, updates a working external storage file on said working system computer according to file update commands from said processes executed on said working computer system, saves file update information according to said file update commands on the said standby system computer, notifies each of said processes originating a file update command upon completion of the update to the working external storage file and saving of file update information to the standby system computer, and updates a standby external storage file according to the file update information saved to the standby system computer after a checkpoint is collected by said checkpoint control unit.

20. A computer-readable memory medium that stores a program for managing files of a duplicated computer system including a working computer system including a working external storage file system and a standby computer system including a standby external storage file system wherein said program for managing files performs the steps of:
collecting checkpoints periodically from which to restart processes executed on said working computer system,
saving the checkpoints collected on both said working computer system and said standby computer system,
updating said working external storage file system according to a file write commands issued from said processes executed on said working computer system,
saving file update information corresponding to said file write commands on said standby computer system,
notifying said processes issuing said file write commands upon completion of updating said working external storage file system and saving said file update information, and
updating said standby external storage file system according to said file update information saved on said standby computer system after a checkpoint is collected.

21. A computer system comprising:
a working external storage file system and a standby external storage file system;
a checkpoint information unit for performing checkpoint acquisition by collecting checkpoint information needed for re-starting an application process on said computer system at a checkpoint and saving said checkpoint information in both said working external storage file system and said standby external storage file system; and
an update process executed on said computer system for updating both the working external storage file system and the standby external storage file system; and
a restoration unit for restoring said working external storage file system upon an interruption of said application process, and restarting said application process from a last acquired checkpoint;
wherein:
said update process, upon receipt of a file write command initiated by said application process, updates said working external storage file system in accordance with said file write command, saves file update information pertaining to said file write command on said standby external storage file system, and notifies said application process upon completion of saving said file update information and updating said working external storage file system,
said update process, upon receipt of a checkpoint command, updates said standby external storage file system in accordance with said file update information saved on said standby computer.

22. A method of managing files on a duplicated computer system including a working computer system, a working external storage file system, a standby computer system, and a standby external storage file system, comprising the steps of:
collecting checkpoints each including information needed for re-starting an application process at a corresponding checkpoint on said working computer system;

processing a file write command issued from said application process executing on said working computer system, including the sub-steps of, updating said workings external storage file system according to said file write command, saving file update information corresponding to said file write command to said standby computer system;

updating said standby external storage file system according to saved file update information upon collection of a checkpoint; and restarting an application process on said working computer system without loss of information, upon occurrence of an interruption of said application process, including the substep of, rolling back a state of said working computer system to a last checkpoint, comprising the substeps of, reading pre-update data from said standby external storage file system in accordance with said file update information saved to said standby computer system, said pre-update data corresponding to data written to said working file system since said last checkpoint, writing said pre-update data to said working external storage file system, thereby restoring said working file system to a state corresponding to said last checkpoint, and removing said file update information corresponding to file write commands since said last checkpoint from said standby computer system.

23. A duplicated computer system that acquires context information of a processor at each of checkpoints, for recovered a state at a previous checkpoint when a fault has occurred, comprising:

a working computer system including at least a working external storage file system and a checkpoint control means;

a standby computer system including at least a standby external storage file system, a checkpoint control means, and a queue buffer for saving writing formation;

means for writing write data into said working external storage file system in said working computer system during execution of an application process;

means for temporarily saving said file writing information in said queue buffer in said standby computer system during execution of said application process; and means for reflecting said file writing information saved in said queue buffer in said standby computer system into said standby external storage file system when a checkpoint acquiring instruction has been issued from said working computer system.

24. The computer system according to claim 23, wherein:

said working computer system reads out pre-updating data from said standby external storage file system based on said file writing information saved in said queue buffer of said standby computer system and rolls back memory information in said working external storage file system to a previous checkpoint when a fault occurs before said working computer system has reached a next checkpoint.

25. The computer system to claim 23, wherein:

said standby computer system rolls back to a previous checkpoint by using the checkpoint control means for re-executing operation instead of said working computer system in a system-down.

* * * * *